Jan. 1, 1935. F. CARDOZA 1,985,974
WELDING ROD
Filed March 16, 1931

INVENTOR.
Frank Cardoza
BY
Harry C. Schroeder
ATTORNEYS.

Patented Jan. 1, 1935

1,985,974

UNITED STATES PATENT OFFICE 1,985,974

WELDING ROD

Frank Cardoza, San Francisco, Calif., assignor to Standard Oil Company of California, San Francisco, Calif., a corporation of Delaware Application March 16, 1931, Serial No. 523,144

4 Claims. (Cl. 219—8)

This invention relates to improvements in welding rods and is directed to the type of welding rod which is provided with a chemically treated combustible coating or cover.

The main object of the invention is to provide an attachable or removable combustible cover for welding rods, which may be applied as desired.

Another object of the invention is to provide a combustible cover for welding rods which will create a non-oxidizing atmosphere about the arc during fusion of the welding rod, and without the usual attendant residue.

A further object of the invention is to provide a welding rod with a coating or covering of "rayon" or artificial silk in the form of a knitted or woven stockinet, which may be applied as desired, and which is provided with a non-combustible coating, such as sodium silicate, commonly known as water glass.

Other objects and advantages of the invention will become apparent as the following description is read on the drawing forming a part of this specification and in which.

Figure 1:
Fig. 1 is a side elevation of my improved welding rod.
Figure 2:
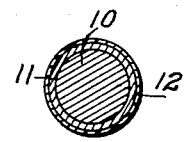
Fig. 2 is an enlarged cross-section of the invention.
Figure 3:
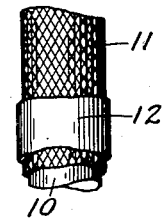
Fig. 3 is a fragmentary view showing the various elements making up my improved welding rod.

The welding rod consists of the usual metal rod 10, a stockinet 11 formed of rayon or artificial silk on said rod, and a thin coating 12 of water glass over the stockinet.

The stockinet may be woven directly on the rod, or may be woven or knitted in proper lengths and slipped over the rod, being then dipped in a substantially thin solution of water glass or other non-combustible substance and in just sufficient amount to prevent combustion thereof except in the immediate vicinity of the arc, where a non-oxidizing atmosphere is created by the burning of the rayon, which leaves substantially no residue. Artificial silk is substantially free from starches and other impurities found in paper or cotton and for this reason welding rods made as described hereinabove give improved results. Residues which tend to introduce impurities into the weld are absent. The manufacture or preparation of a rod when artificial silk is used as herein described is rapid and economical. The prolonged purifying steps heretofore suggested are obviated.

The stockinet can be supplied for use with any plain welding rod, it merely being necessary to slip the stockinet over the rod and dip in a weak sodium silicate solution and allow to dry. A thin glass like coating is thus produced which prevents combustion of the rayon except under conditions of extreme heat. The use of a woven covering (either in the form of a preformed tube or stocking or woven directly on the wire) gives rise to numerous advantages. Close adherence of the fibre to the rod is attained. Such woven sleeves are flexible, permitting the rod to be bent without destroying the continuity of the coating. During use the fibre coating is continuously and uniformly consumed without spalling or cracking.

It will be understood that variations in structure and material which are consistent with the appended claims may be resorted to without detracting from the spirit or scope of the invention or sacrificing any of the advantages thereof.

I claim:—

1. In combination, a welding rod, a rayon sleeve on said rod, said sleeve being impregnated with a non-combustible substance.

2. In combination, a welding rod, a woven rayon sleeve on said rod, said sleeve having a coating of sodium silicate formed thereon.

3. In combination with a welding rod, a woven sleeve of rayon encompassing said rod.

4. In combination with a metallic welding rod, a covering including a woven member of artificial silk.

FRANK CARDOZA.